April 6, 1965   J. O. NATWICK ETAL   3,176,646
TOW CABLE WITH MINIMUM WIDTH FAIRINGS
Filed Oct. 29, 1963   7 Sheets-Sheet 1

INVENTORS:
JULIUS O. NATWICK
DONALD A. NICHOLS
BY
ATTORNEY

April 6, 1965  J. O. NATWICK ETAL  3,176,646
TOW CABLE WITH MINIMUM WIDTH FAIRINGS
Filed Oct. 29, 1963  7 Sheets-Sheet 4

INVENTORS:
JULIUS O. NATWICK
DONALD A. NICHOLS
BY
ATTORNEY

United States Patent Office 3,176,646
Patented Apr. 6, 1965

3,176,646
TOW CABLE WITH MINIMUM WIDTH FAIRINGS
Julius O. Natwick and Donald A. Nichols, Niantic, Conn., assignors to the United States of America as represented by the Secretary of the Navy
Filed Oct. 29, 1963, Ser. No. 319,902
20 Claims. (Cl. 114—235)
(Granted under Title 35, U.S. Code (1952), sec. 266)

The invention described herein may be manufactured and used by or for the Government of the United States of America for governmental purposes without the payment of any royalties thereon or therefor.

This invention relates to the towing of submerged objects commonly called "fish," such as sonar devices, for example, from a ship, and particularly to a towing cable with fairings thereon which has minimum width or thickness of such fairings and an improved electrical cable thereon. Naval operations, at times, require the towing of submerged sonar devices for sending and/or receiving of signals, and when in waters where there may be enemy craft or in battle, the towing ship must move at high speeds, in which circumstances the water resistance or drag is great, and the lower end of the cable tends to fall far behind the ship and because of this tends to rise above the depth level intended for the towed device.

The fairing, composed of many sections abutting end to end, prevents vibration of the cable as the towed body is towed at various speeds. As a result, there are no nodes in the cable which might cause the wires that extend along the cable to be broken by fatigue. It is desirable to reduce the thickness or width of the fairing as much as possible, in order to have a minimum of resistance to movement of the tow line through the water, but the thickness or diameter of the towing cable limits the extent of such reduction in width or thickness. Where the electrical conductors connected to the towed body are within the cable, the thickness or width of the fairings is necessarily quite large, and if the conductors are provided separately from the cable in order to reduce the diameter of the cable, they have been exposed to danger of damage thereto and may interfere with flexing of the cable.

An object of this invention is to provide an improved flexible tow line with fairings therein, which will have minimum possible width or thickness of fairings in order to reduce the drag thereon in the water and to enable use of a smaller diameter tow cable, with which danger of damage to the conductors leading to the towed object from the towing craft is substantially eliminated, with which individual fairing units may be easily and quickly replaced, or attached to or removed from the towing cable and conductors, which will not prevent limited separation and approach of adjacent fairing units during flexing and straightening of the tow cable, and which will be relatively simple, compact, practical, durable and inexpensive in construction, and effective and dependable in use.

Other objects and advantages will appear from the following description of an embodiment of the invention, and the novel features will be particularly pointed out in connection with the appended claims.

In the accompanying drawings:

FIG. 9 is a sectional elevation, on the same scale of another part of the same fairing unit, the section being taken approximately along the line 9—9 of FIG. 6;

In accordance with this invention, the stream-lined fairing units are pivoted on the tow cable or wire rope by having aligned passages in the units through and along which the tow cable passes successively, and the electrical conductors, through which the ship maintains communication with the towed body, are in flat ribbon form disposed in the same passages of the fairing units through which the tow cable passes, and extending alongside the tow cable. Some limited separation between adjacent fairing units usually occurs when the cable is flexed, as in use or when wound on a drum for storage, and slack is provided in the conductor ribbons within the passage of each fairing unit to enable such limited relative separation and approach of adjacent fairing units.

Figure 1:
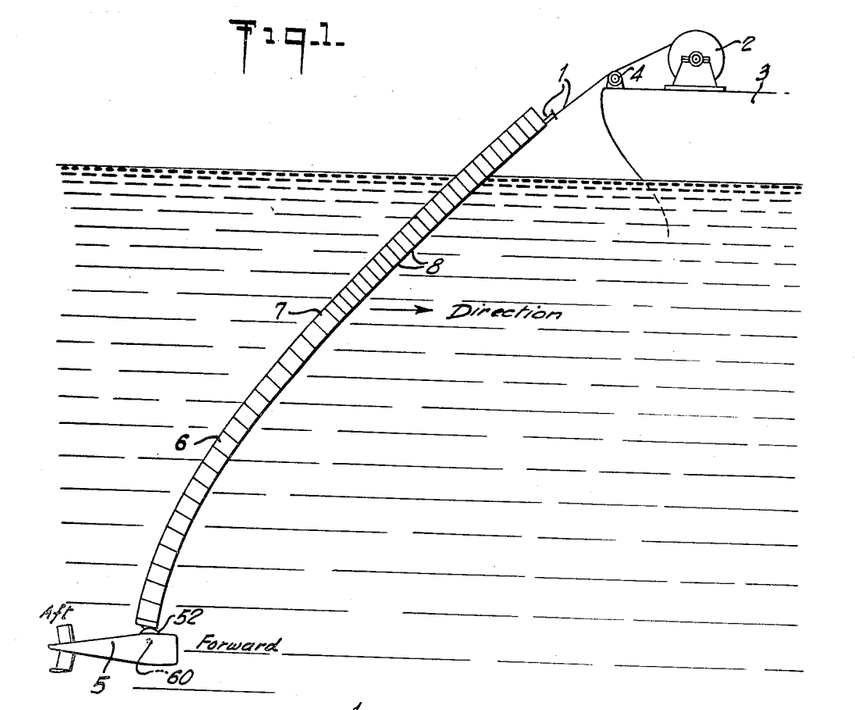
FIG. 1 is a schematic view illustrating the manner of use of a faired tow line in towing a submerged object from a ship.
Figure 2:
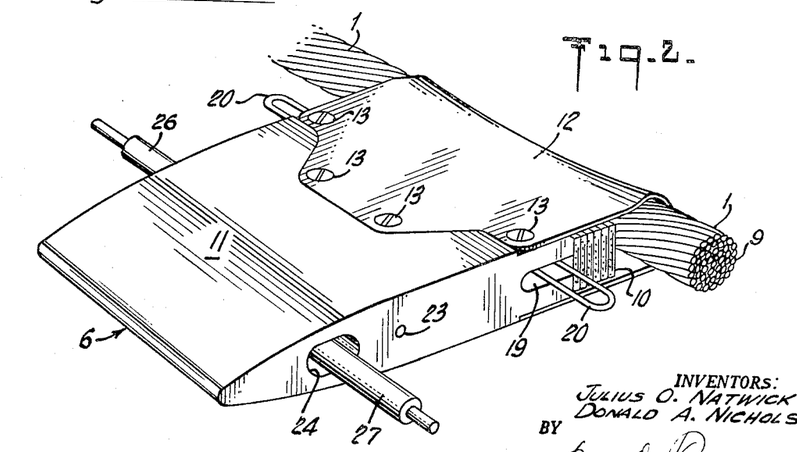
FIG. 2 is a perspective of a portion of the tow line carrying one fairing unit and constructed in accordance with this invention.

In the illustrated embodiment of the invention, and referring first to FIGS. 1 and 2, the usual flexible tow cable or wire rope 1, which, when not in use, is wound on a hoist drum 2 on the rear part of a towing ship 3, in use passes from the drum 2 over an idler sheave 4 into the water and at its free or lower end it is pivotally attached to an object or fish 5 to be towed submerged, such as to a sonar device. Pivoted on the tow cable 1, in end to end abutting contact with one another, are a plurality of individual fairing units or sections 6, 7 and 8 extending from close to the towed object 5 to at least about or above the surface of the water in which the ship is moving. The cable 1 (FIGS. 2–4) is usually a wire rope formed of a helically wound bundle of flexible metal wires 9.

Figure 3:
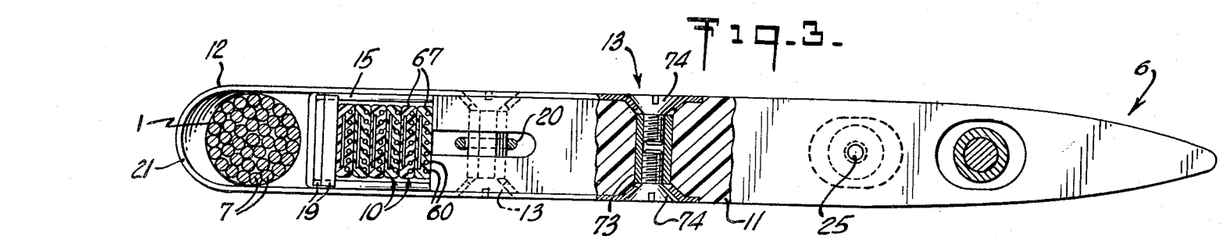
FIG. 3 is a full size, side elevation, partly in section, through the fairing unit shown in FIG. 2, the view being approximately along the line 3—3 of FIG. 6 in the direction of the arrows.
Figure 4:
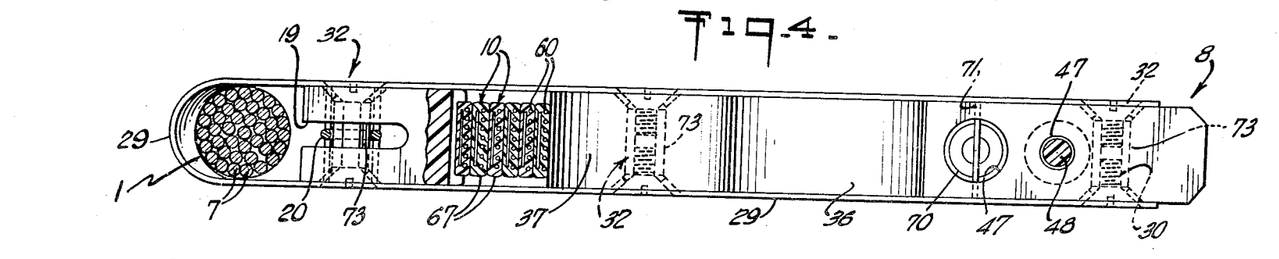
FIG. 4 is a similar view of another fairing unit, as viewed from line 4—4 of FIG. 10.
Figure 5:
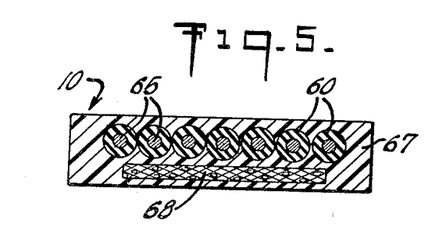
FIG. 5 is an enlarged transverse, sectional elevation of one of the conductor carrying ribbons employed as part of the tow line.
Figure 6:
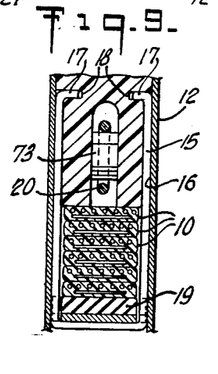
FIG. 6 is a plan, partly in section and on a reduced scale of a part of the tow line, and illustrating the construction of some of the fairing units and their connection to one another and to the cable.
Figure 7:
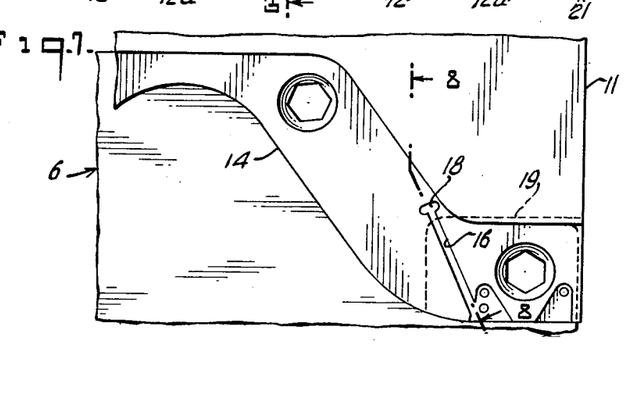
FIG. 7 is a plan, at nearly full scale, of a part of one of the fairing units shown in FIG. 6.
Figure 8:
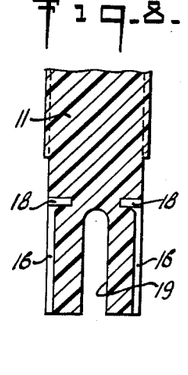
FIG. 8 is a sectional elevation of the same, with the section taken approximately along the line 8—8 of FIG. 7.

The fairing units 6, 7 and 8 vary somewhat in details of construction, a unit 6 being shown separately, but on the tow cable, in FIGS. 2–4, and a group of them assembled on the tow cable in FIG. 6. There is only one unit 7 which is disposed on the tow cable between the units 6 and 8, and it serves as a conversion or transition unit in changing the position of the ribbon conductor strips 10 (FIG. 5) as will be explained later herein. The conversion unit 7 and several upper units 8 are shown as assembled on the tow cable 1 in FIG. 10.

Each lower fairing unit 6, FIGS. 2 to 9, is formed of a tail piece or body 11 (FIG. 2) of fairly rigid material such as of plastics or fairly stiff rubber or rubber substitutes. These tail pieces or bodies 11 are preferably made of polypropylene because it is light in weight, buoyant, strong and rigid, is not affected adversely by immersion in sea water and can be easily molded to the desired shapes and configurations. A metal nose piece 12 of sheet material, such as sheet metal, having a channel shape that is U-shaped in transverse cross-section, fits over or straddles the tow cable 1 and telescopes over and embraces one marginal edge portion of the tail piece 11, leaving an open space or channel between the tow cable 1 and the embraced edge portion of the tail piece 11 along and in which a stack of the flat ribbon conductor strips 10 is disposed. The arms of the nose piece fit and are received flush in shallow depressions in the faces of the tail piece and are detachably secured to the tail piece body by screws or bolts 13.

The edge wall of the tail piece which is received within the nose piece 12 is notched or recessed inwardly between its ends, so as to provide recesses or notches 14 (FIG. 6) into which the stack of ribbons 10 may normally be deflected sidewise and provide a slack therein that can be pulled out or straightened somewhat as the tow cable flexes and the conductor stack is pulled due to rocking separation of the units 6. The ribbon conductor strips 10 in the stack are confined to the tail piece at one end only thereof by generally U-shaped spring clamps 15 (FIGS. 6 and 9) that embrace the stack of ribbon strips 10 and have spring arms that extend along the sides of the stack and then in grooves 16 (FIGS. 7–9) in the opposite faces of the tail piece body 11. The free ends of the arms of each clamp 15 are turned or bent toward one another at 17 (FIG. 9) and snap into recesses 18 (FIG. 8) in the faces of the tail piece body 11 beneath the arms of the nose piece 12. A resilient pad 19 (FIG. 6) is disposed between the cross part of the clamp 15 and the outer ribbon conductor strip 10 of the stack so that the clamp 15 will tightly clamp and confine the stack of conductor ribbon strips 10 to the tail piece at one end only thereof and against movement therealong, so that these strips 10 may move into and out of the notch 14 through the other end face in order to provide a slack that will enable limited separation of adjacent tail pieces as the tow cable flexes, which occurs when the cable is wound or unwound on the drum 2 or flexes in the water in use.

Each tail piece 11 at each end has a slot or notch 19 at the end wall which is received within the nose piece, and one of the screws or bolts 13 near each end of the tail piece 11 passes across each notch 19 in the interior thereof. A closed loop member 20 is disposed in the adjacent notches 19 of adjacent tail pieces, with the bolts 13 that pass across such notches passing also through the interiors of the ends of loop members 20, with sufficient lost motion to enable substantial separation of the tail pieces so connected as the tow cable is flexed. The ends of the nose pieces are beveled at 21 from about the center of the tow cable outwardly to enable limited rocking of the fairing units on the tow cable as the latter flexes.

Each tail piece has an axially elongated recess 22 that extends from end face to end face but is greatly reduced in cross-section at 23 adjacent one end face. Each tail piece also has another similar, axially elongated recess 24 from end face to end face with a reduced end portion 25. The recesses 22 and 24 are disposed side by side but spaced apart at different distances from the nose piece, and adjacent tail pieces have their reduced end portions 23 and 25 abutting and aligned with one another and with their larger ends abutting and aligned with one another. A flexible rod 26 (FIG. 2) is disposed in each pair of aligned recesses 22 and another flexible rod 27 (FIGS. 2, 6, and 10) is disposed in each pair of aligned recesses 24. These rods 26 and 27 keep the tail pieces aligned with one another along the cable as the cable flexes in use, while permitting the free ends of the adjacent tail pieces to separate somewhat during the flexing of the tow cable. The cross part 12a of the nose piece along which the cable 1 extends is curved somewhat from end to end to allow the cable 1 to flex within the nose piece, when the tow line is flexed in use.

Figure 10:
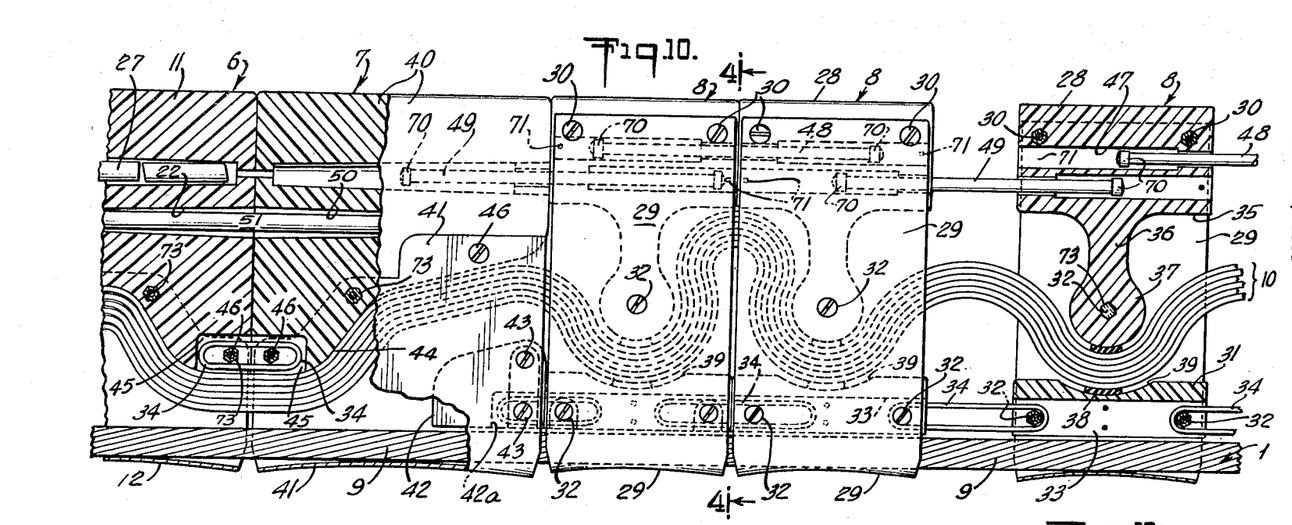
FIG. 10 is a plan of another part of the tow line, with some of the fairing units partly in section.
Figure 13:
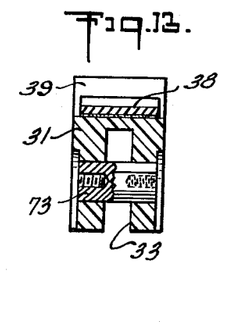
FIG. 13 is a sectional elevation of the part shown in FIG. 12, the section being taken approximately along the line 13—13 of FIG. 12.
Figure 14:
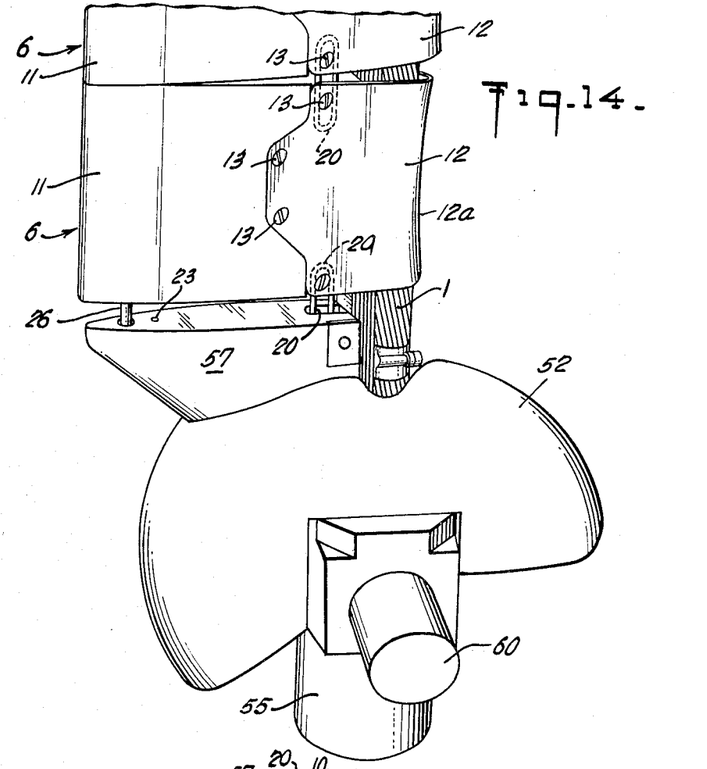
FIG. 14 is a perspective of the lower or free end of the tow line, terminating in a coupling by which it may be attached to the fish or body to be towed.
Figure 15:
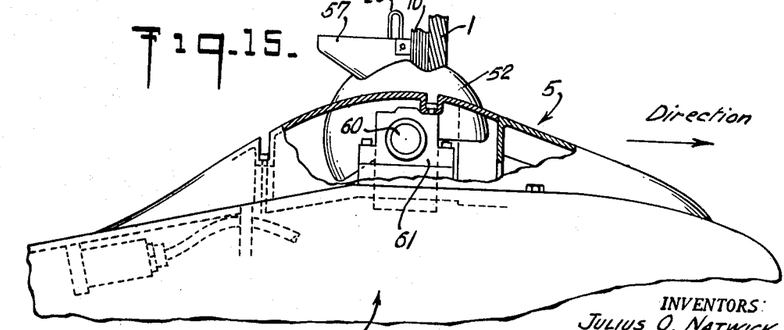
FIG. 15 is a side elevation, partly in section of the upper part of the fish or body to be towed, and illustrating the coupling thereto of the tow line.
Figure 16:
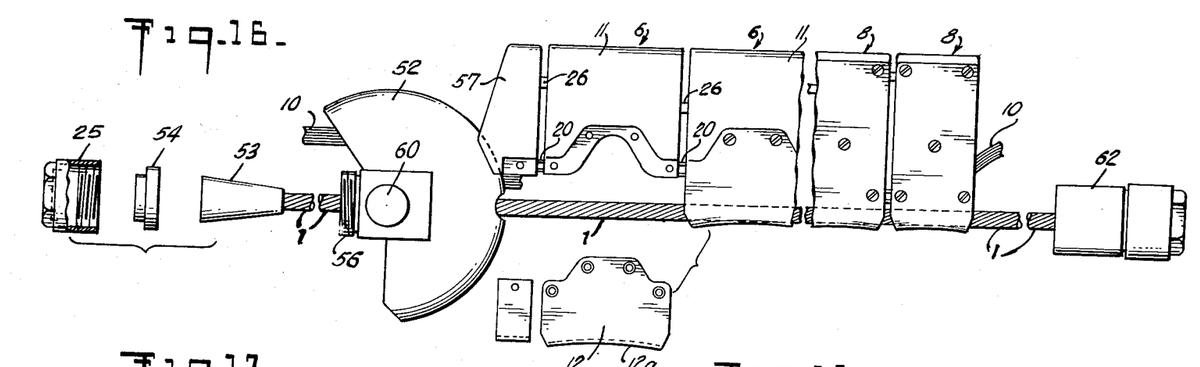
FIG. 16 is a plan of some of the elements of a tow line, showing the connections to the ends of the tow rope, with some of the parts separated, as in an exploded view, but arranged in the order for assembly.
Figure 17:
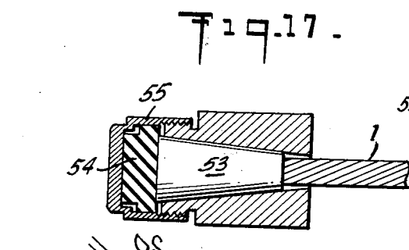
FIG. 17 is a sectional elevation of the part of the anchorage of the tow cable or rope to a fish.
Figure 18:
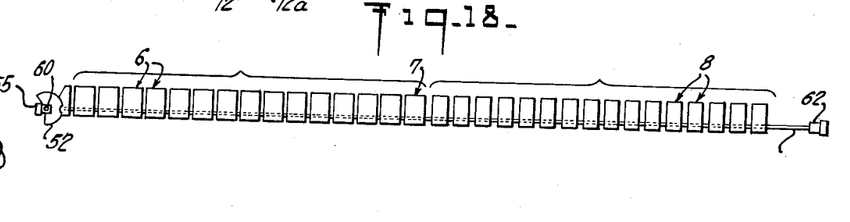
FIG. 18 is a diagrammatic view, on a reduced scale, of a tow line illustrating the initial assembly of fairing units on the tow cable.
Figure 19:
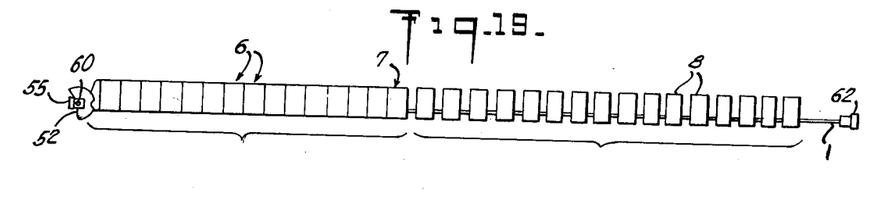
FIG. 19 is a similar diagrammatic view of the same after stacking of the units.

The units 8 on the upper end of the tow line cable 1 are shown in greater detail in FIGS. 10–13 and differ somewhat from the units 6 that were described above. Each unit 8 has a tail piece 28 of the same material as tail piece 11 of FIGS. 1–4, such as of wood or polypropylene, for example. A nose piece 29 of metal, of U-shape, receives a part of the tail piece 28 between the arms of the U, and is secured to the tail piece by a plurality of bolts 30 (FIGS. 10 and 13).

An auxiliary tail piece 31 is disposed within the nose piece and along the cable 1, as shown in the right unit in FIG. 10, and bolts 32 pass between the side walls of the nose piece and through the piece 31 to secure it in the position indicated. This piece 31 has a slot 33 from end to end, across which slot the bolts 32 pass. Closed loop links 34 are disposed in opposite ends of the slots 33 and the bolts 32 pass through the loops of the links 34 to provide couplings between adjacent units 8. The inner edge 35 of each tail piece 28 has a post 36 that extends toward but terminates short of the other tail piece 31, and the free end of this post is enlarged to form a somewhat cylindrical head 37.

The stack of conductor ribbons 10 passes through the nose piece between the tail pieces 28 and 31 and are clamped between the head 37 and the tail piece 31, with resilient pads 38 disposed one between the head and the stack of conductor ribbons, and the other between the stack and the piece 31, and both cemented in positions. The piece 31 has a concave recess 39 facing the head 37 into which the conductor ribbon and one pad 38 extend, which with the compression on the pads holds the conductor ribbons against linear movement in the unit except as the conductor ribbons flex away from the post when two adjacent units 8 separate somewhat from one another, as shown by the two units at the right in FIG. 10. When the separated units 8 move back together, the conductor strips 10 will flex back against the sides of the posts 36 to provide slack enabling another separation of the units 8.

Figure 11:
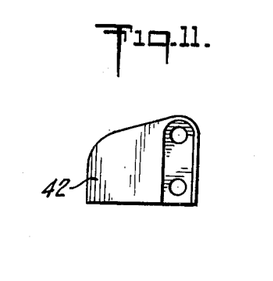
FIG. 11 is a plan of a part of one of an intermediate fairing unit shown second from the left in FIG. 10.
Figure 12:
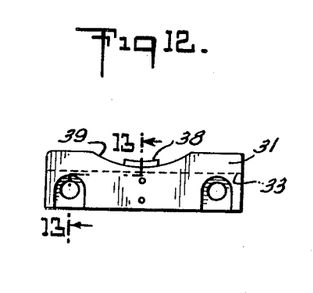
FIG. 12 is a plan of part of another of the fairing units, such as one at the right in FIG. 10.

The transition unit 7 is the second unit from the left in FIG. 10, and has one tail piece 40, of the same material as the other tail pieces, received between the sides of a metal, U-shaped nose piece 41, and another and smaller tail piece 42 of the same material as tail piece 40, the latter being shown separately in FIG. 11. A pair of bolts 43 pass between the arms of the nose piece and through the tail piece 42 to hold the latter firmly in place.

The inner edge 44 of the tail piece 40, at one end thereof is aligned with that edge of the next adjacent unit 6 along which the ribbons 10 extend, and at its opposite end it extends close to the inner edge 35 of the tail piece 28 of the next adjacent unit 8, so that the conductor ribbons 10 may pass from adjacent the tow rope 1 in a unit 6 to a position remote from the tow rope 1 and near the base of the post 36 in the next adjacent unit 8. Bolts 46 pass between the arms of the nose piece through the tail piece 40.

The tail piece 40 has a slot 45 in its end face across which one of the bolts 46 passes and a closed loop link 34 enters this slot 45. A bolt 46 passes through the loop of link 34 to provide a lost motion coupling to the next adjacent unit 6. The slot 45 is aligned with the corresponding slot in the abutting end face of the next adjacent unit 6. The tail piece 42 has a similar slot 42a opening outwardly through an end face and across which one of the bolts 43 passes. A closed loop coupling link 34 is received in this slot 42a, and the bolt 43 passes through the loop of this link to couple unit 7 to the next adjacent link 8.

The tail pieces 28 of units 8 have passages 47 that are parallel to, but spaced, at different distances from, the tow cable or rope 1, in which passages flexible coupling aligning rods 48 and 49 are disposed and each of which extends into a next adjacent unit to keep adjacent units aligned with one another on the tow rope or cable in the same manner that units 6 are kept aligned by their rods 26. The transition unit 7 also has two similar passages 50 into one of which passages 50 extends an end of a flexible rod 49 from the next adjacent unit 8, and into the other of which passages 50 extends a rod 51 from the next adjacent unit 6, to keep the transition unit 7 approximately aligned with the adjacent units 6 and 8 even as the cable flexes and the units tend to separate from one another.

Figure 20:
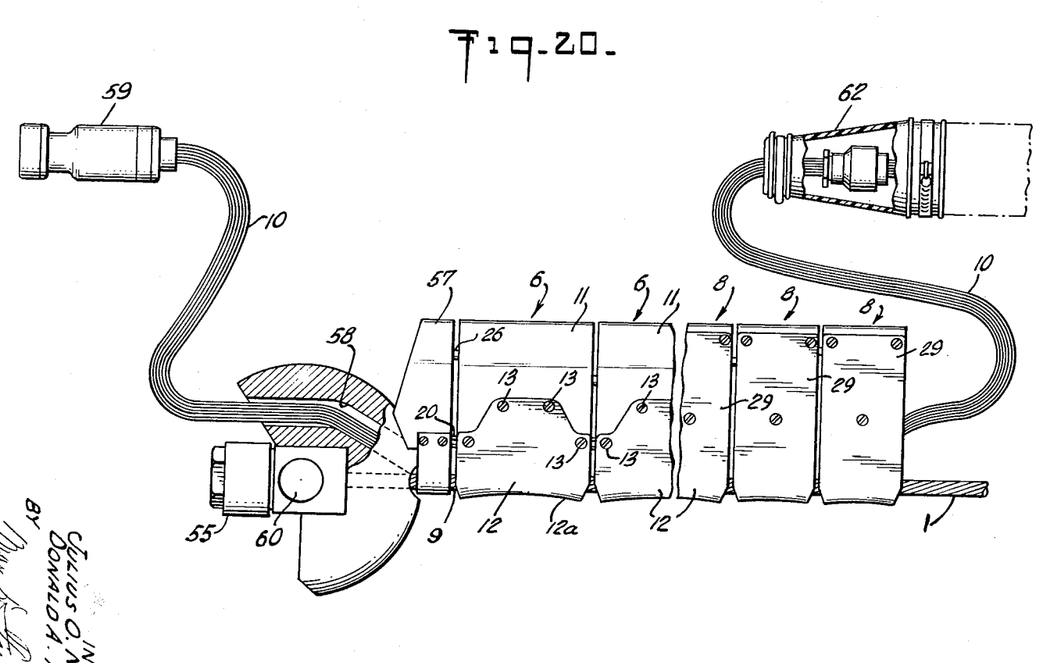
FIG. 20 is a view of the tow line, particularly illustrating how the electrical conductors of the tow line terminate.

One manner in which the lower or free end of the tow cable 1 and fairing units 6 may be coupled to the fish 5 or object being towed is illustrated in FIGS. 14, 15, 16 and 17. The free end of the cable or rope 1 extends into and through a member 52 (see FIGS. 14 and 16) where it terminates in a frusto-conical element or block 53 (FIGS. 16 and 17) cast thereon. This block is received in and fits a frusto-conical recess in the lower end of the passage through member 52, and is removably confined therein by a disc 54 that abuts the large outer end of the block 53. A cap 55 is screwed to a hub 56 on the member 52, fits over the disc 54, and confines the block 53 in its recess in member 52. The member 52 has a flange 57 on its upper edge, with a cross-sectional shape corresponding to that of a fairing unit 6, and it is coupled to the lowest unit 6 by a link 20 and a flexible rod 26, the same as between adjacent units 6. The conductor ribbons 10 extend past the flange 57, through a passage 58 (FIG. 20) in member 52, and then terminate in a coupling head 59 by which the conductors in the ribbons may be detachably connected electrically to circuits within the fish 5. The member 52 has aligned stub shafts 60 on its opposite faces which are rockably mounted in bearings 61 within the fish 5, so that the fish can rock on an axis crosswise of its direction of travel through the water when towed.

At the upper end of the tow line, the rope 1 terminates (FIG. 16) in the usual or any suitable anchorage element 62. The conductors in the ribbons 10 are connected to shipboard circuits in the usual manner. The element 62 is secured to the towing ship in the usual or any suitable manner.

One of the ribbon conductors 10 is shown in cross-section on an enlarged scale in FIG. 5. It is formed of a plurality of flexible, electrical wires 65, each encased in a covering 60 of insulating material, disposed in side by side relation and the group of insulated wires is encased in a water impervious body 67 of flexible insulating material, such as any polyvinyl chloride or polyethylene, natural rubber or any of the synthetic rubber substitutes, for example, neoprene, or any other suitable insulating material. Such jacket material is preferably extruded continuously in long strips over the groups of conductors and braid 68, and should be capable of withstanding sunlight and temperatures ranging from about −50° F. to +150° F. This wire braid 68 is encased in the insulating elastomeric material 67, along and parallel to, but spaced from, the conductors, and entirely encased by the material 67. This braid serves as an electrical shield between adjacent layers of ribbons, and also may be used as an electrical conductor that has approximately the same or higher current carrying capacity as the total capacity of the individual conductors within a particular ribbon. It can serve as a common electrical return for the individual insulated conductors. The braid may be made stiffer to have minimum stretch and thereby could take up some of the endwise pull on the ribbon conductors. This greater stiffness could be obtained by using a somewhat different braid construction or by extruding the jacket material 67 more deeply into the interstices of the braid.

Whenever such a tow line with fairings is assembled, small gaps are left between the units or sections. These gaps are not removed or eliminated until the tow line is prepared for use aboard ship at sea. The process of removing the gaps is called stacking. During the stacking procedure the tow line is payed out nearly all of the way, so that each fairing unit or section will rest on the one below it and thereby close the gaps. As the fairing units or sections slide downwardly they move relatively to their former positions on the wire rope. Since each fairing unit or section has within itself fixed lengths of ribbon conductors and the top common fairing unit may move about 10 feet down the wire rope, some provision must be made to maintain electrical continuity. The large storage capacity fairing units store ribbon conductors with slack in a manner which allows the top section of the common fairing to move down the wire rope as much as 10 feet or more and still maintain electrical continuity to the electrical connector 62 at the top of the towline. The fairing of this invention can serve this necessary function because each unit or section thereof has a sufficient length of conductor ribbons and space within it to allow adjacent units or sections to separate widely and thereby provide additional length of ribbon conductors along the wire rope, something like the action of a folding door or accordion. This fairing acts like a series of storage boxes and protective cases that dispense an expandable, variable length of ribbon conductors.

It will be noted that the nose pieces of adjacent sections or units are kept apart by making the tail pieces longer in a direction along the tow rope than the nose pieces. Because of the necessarily wide gaps that occur between units, and particularly between the units 8, the rods 48 and 49 (FIG. 10) had to be captured within the tail pieces by the use of short, cylindrical nuts or heads 70 at each end of an aligner rod 48 and 49, and by the use of pins 71 across the passages 47 to block the large ends of the aligner holes or passages and prevent any danger of complete removal of an aligner rod from a passage in a tail piece.

The sides or arms of the nose pieces are countersunk flush into the portions of the tail pieces which they overlie, and the areas in the arms or sides of each nose piece against which the heads of the bolts abut, are deformed inwardly as bosses to enable the heads or nuts of the bolts to be countersunk flush into the outer faces of the sides of the nose piece, as shown clearly in FIGS. 3 and 4. Each bolt that passes between the sides of each nose piece is preferably, as shown in FIG. 3, made of a sleeve 73 of outside hexagonal shape in cross-section, or other non-cylindrical shape, of a size to have a forced fit in the hole in the tail piece in which it is placed, so as to hold it against rotation or endwise displacement in the tail piece. Then screws 74 are threaded into opposite ends of the sleeve, with the heads of the screws countersunk into the bosses in the nose pieces. Each flexible rod 26 and 48 may be a length of flexible hose with a flexible, plastic rod insert in it.

It will be understood that various changes in the details, materials and arrangements of parts (and steps) which have been herein described and illustrated in order to explain the nature of the invention, may be made by those skilled in the art within the principle and scope of the invention as expressed in the appended claims.

We claim:

1. A tow cable with fairings thereon by which a submerged object may be towed from a ship which comprises:
   (a) a flexible tow cable,
   (b) a plurality of fairing units arranged in end to end abutting relationship along, and individually pivotally mounted upon said cable,
   (c) each such unit having a channel-shaped nose-piece, with the cable received in and extending along the channel of the nose-piece, and a tail piece having an edge portion received in and closing the open face of the channel,
   (d) means connecting the opposite sides of the channel of each nose piece, at intervals along it, and passing through the portion of the tail piece which is received in the channel for confining the tail piece to the nose-piece,
   (e) said tail piece, intermediate of its ends, having in its edge face which is received in the channel of said nose-piece, a notch that opens towards said cable,
   (f) means for coupling together adjacent ends of adjacent tail pieces with a lost motion connection permitting limited separation of adjacent units along the cable as the cable flexes,
   (g) a flat conductor-carrying ribbon extending along said cable within said channels of said nose-pieces and between said cable and the tail pieces, with said ribbon extending into and out of said notches in said tail pieces to provide slack therein that permits said limited separation of adjacent tail pieces, and
   (h) means connecting adjacent abutting ends of adjacent tail pieces at substantial distances away from said nose pieces for keeping said units approximately aligned with one another along said cable.

2. The cable with fairings thereon according to claim 1, wherein said ribbon comprises a plurality of insulated electrical conductors arranged side by side in a flat layer and extending in a direction lengthwise of the ribbon, the layer of conductors being encased in a jacket of electrically insulating material.

3. The cable with fairings thereon according to claim 1, wherein said ribbon comprises:
   (a) a plurality of insulated electrical conductor wires arranged side by side in a flat layer and extending in a direction lengthwise of the ribbon,
   (b) a reinforcing strap disposed against a face of said layer of conductor wires and extending lengthwise of and within the ribbon, and
   (c) a jacket of insulating material encasing said layer of conductor wires and said strap.

4. The cable with fairings thereon according to claim 1, wherein said ribbon comprises:
   (a) a plurality of insulated electrical conductor wires arranged side by side in a flat layer and extending in a direction lengthwise of the ribbon,
   (b) a reinforcing flat, woven metal braid disposed against a face of said layer of conductor wires and extending lengthwise of and within the ribbon, and
   (c) a jacket of insulating material encasing said layer of conductor wires and said strap.

5. The cable with fairings thereon according to claim 1, wherein said ribbon comprises:
   (a) a plurality of insulated electrical conductors arranged side by side in a flat layer and extending in a direction lengthwise of the ribbon, the layer of conductors being encased in a jacket of polyvinyl chloride.

6. A tow cable with fairings thereon by which a submerged object may be towed from a ship, which comprises:
   (a) a flexible tow cable having a connection at its free end formed for attachment to the object to be towed,
   (b) a plurality of individual fairing units arranged in succession, and end to end abutting relation to one another, along that portion of said cable that may be in the water while an object is being towed,
   (c) each such unit having a channel-shaped nose piece with the cable received in and extending along the channel of the nose piece, and a tail piece having an edge portion received in and closing the open face of the channel,
   (d) means detachably connecting together the opposite sides of the channel of each nose piece, at intervals along it, and passing through the said edge portion of the tail piece within the nose piece for confining the tail piece detachably to the nose piece,
   (e) said tail piece having in its edge face of its said edge portion that is received within the nose piece, a recess that opens towards the cable,
   (f) means for coupling together adjacent ends of adjecent units with a lost motion that permits limited separation of the units during flexing of the cable,
   (g) a plurality of conductor-carrying flat ribbons disposed in face to face abutting relation to one another in a stack, extending along said cable within the channels of the nose pieces and between the cable and the tail pieces, with the ribbons all extending into and out of the said recesses in said edge portions of said tail pieces to provide slack in the ribbons that can tend to straighten out and permit said limited separation of adjacent units as the cable is flexed, and
   (h) means extending between adjacent units for keeping their adjacent tail pieces approximately aligned with one another along the cable.

7. The cable with fairings thereon according to claim 6, wherein each ribbon has a flat layer of conductor wires disposed in side by side and electrically insulated relation to one another and all encased in a flexible jacket of electrically insulating material.

8. The cable with fairings thereon according to claim 6, wherein:
   (a) each ribbon has a plurality of electrical conductor wires insulated from one another and arranged side by side in a flat layer that extends in a direction lengthwise of the ribbon, with the flat faces of the ribbons abutting face to face and one of the outer layers of the stack abutting face to face against that edge face of the tail piece which is received in the nose piece, and the stack of ribbons extending into and out of said recesses in the tail pieces to provide the slack that permits said limited separation of adjacent units as the cable is flexed.

9. The cable with fairings thereon according to claim 6, wherein:
   (a) each ribbon has a plurality of electrical conductor wires insulated from one another and arranged side by side in a flat layer that extends in a direction lengthwise of the ribbon and also has a flat woven metal braid in face to face relation to the layer of conductor wires, the layer of conductor wires and braid being encased in a flexible water impervious jacket of electrically insulating material.

10. The cable with fairings thereon according to claim 6, wherein:
    (a) each ribbon has a plurality of electrical conductor wires insulated from one another arranged side by side in a flat layer that extends in a direction lengthwise of the ribbon, with the flat faces of the ribbons abutting face to face and one of the outer layers of the stack abutting face to face against that edge face of the tail piece which is received in the nose piece, and the stack of ribbons extending into and out of said recesses in the tail pieces to provide the slack that permits said limited separation of adjacent units as the cable is flexed, (b) each ribbon having the group of wires therein encased in a flexible jacket of electrically insulating material.

11. A tow cable with fairings thereon by which a submerged object may be towed from a ship, which comprises:

(a) a flexible tow cable having a connection at one end formed for attachment to the object to be towed, (b) a plurality of individual fairing units arranged in succession and in end to end abutting relation to one another, along that portion of the cable from its said one end to approximately the surface of the water in which the cable may tow said object, and each streamlined toward their trailing edges, (c) each such unit having a channel-shaped nose piece through and along the bottom of which said cable extends, and also having a tail piece having a marginal edge portion received in and extending along the channel of the nose piece and closing the open face of the channel, but leaving a space between the cable and said marginal edge portion of the tail piece, (d) means coupling together the opposite sides of the channel of each nose piece, at intervals along it, and passing through the said marginal edge portion of the tail piece which is received in a nose piece for confining each tail piece to its nose piece, (e) means for coupling together adjacent ends of adjacent units with a lost motion that permits limited separation of the units during flexing of the cable, (f) a conductor carrying flat ribbon extending along and within the channels of the units between the cable and the tail piece in each unit, and having a length in each unit greater than the length of the nose piece of that unit and flexed upon itself in the channel of each unit when the cable is unflexed to provide enough slack for such limited separation of adjacent units permitted by said lost motion coupling means when the cable is flexed, and (g) said ribbon having a plurality of electrical conductor wires arranged in a side by side relation to one another in a flat layer, electrically insulated from one another, and encased in a water impervious jacket of flexible electrically insulating material.

12. The cable with fairings thereon according to claim 11, wherein said ribbon also contains therein a flat woven metal braid disposed in face to face relation to said layer of conductors.

13. A tow cable with fairings thereon by which a submerged object may be towed from a ship, which comprises:

(a) a flexible tow cable having a connection at one end formed for attachment to an object to be towed, (b) a plurality of individual fairing units each freely slidable on and along and pivoted on said cable, and arranged in succession and in end to end abutting relation to one another, along that portion of the cable from its said one end to approximately the surface of the water in which the cable may tow said object and each approximately streamlined from its leading edge toward its trailing edge, (c) said units having aligned passage from end to end along their leading edges through which said cable passes, (d) means coupling together adjacent units, adjacent said passages, with a lost motion that limits their separation from one another along the cable, (e) aligning means also coupling adjacent units near their trailing edges for keeping the units substantially aligned with one another on said cable, (f) a flat ribbon extending successively through said passages of said units through which said cable passes and carrying therein a plurality of electrical conductors disposed side by side in electrically insulated relation to one another with a face of the layer in a plane normal to the length of the unit in a direction away from the cable, and encased in a water impervious jacket of insulating material, (g) each of said passages having a sidewise enlargement intermediate of its ends and said ribbon being flexed into said enlargements when the units are in abutting contact end to end but straightening out somewhat as the units have said limited separation during flexing of the cable.

14. The tow cable with fairings thereon according to claim 13, and said ribbon having a flat, woven wire braid arranged in face to face relation to said layer of said conductors and encased in said jacket.

15. A tow cable with fairings thereon by which a submerged object may be towed from a ship which comprises:

(a) a flexible tow cable having a connection at one end formed for attachment to an object to be towed, (b) a plurality of individual fairing units each freely slidable on and along and pivoted on said cable, and arranged in succession and in end to end abutting relation to one another, along that portion of the cable from its said one end to approximately the surface of the water in which the cable may tow said object and each approximately streamlined from its leading edge toward its trailing edge, (c) said units having aligned passages from end to end along their leading edges through which said cable passes, (d) means coupling together adjacent units, adjacent said passages, with a lost motion that limits their separation from one another along the cable, (e) aligning means also coupling adjacent units near their trailing edges for keeping the units substantially aligned with one another, (f) a plurality of flat ribbons disposed face to face in a stack and extending successively through said passages in said units through which said cable passes and each carrying therein a plurality of electrical conductors, disposed side by side in a layer and in electrically insulated relation to one another and encased in a water impervious jacket of insulating material, a face of each ribbon in said stack being in a plane normal to the length of the unit in a direction from the leading edge to the trailing edge of that unit, and (g) each of said passages having a sidewise enlargement intermediate of its ends and said stack of ribbons being flexed sidewise together into said enlargements when the units are in abutting contact end to end, but straightening out somewhat as the units tend to separate in their limited separation during flexing of said cable.

16. The tow cable with fairings thereon according to claim 15, wherein each of said ribbons has a flat, woven wire braid arranged in face to face relation to the layer of said conductors in that ribbon and encased within the jacket of that ribbon.

17. A tow line by which a submerged object may be towed from a ship, which comprises:

(a) a flexible tow cable, (b) a plurality of fairing units arranged in end to end relationship along and freely and individually pivotally and slidably mounted upon said cable, (c) means for coupling together adjacent units with lost motion movement enabling limited separation of the units upon flexing of the cable, (d) means connecting adjacent units for keeping adjacent units approximately aligned with one another on the cable, (e) a plurality of conductors for establishing communication between said object and said ship extending along said tow cable through said units from adjacent said object to adjacent the opposite end of said cable and having overall lengths greater than the combined overall lengths of said units, (f) said units having spaces therein into which said conductors are flexed sidewise when adjacent units are close together and out of which the conductors may be pulled and straightened out when such adjacent units separate somewhat as permitted by said lost motion movement during flexing of the cable, one group of the units on the end portion nearest said object having the conductors disposed between said coupling means and said cable, and another group of units on the opposite end portion having the conductors disposed at the side of said coupling means opposite from said cable, and a transition unit between said groups in which the conductors at the end of this unit adjacent said one group pass between the coupling means and the cable, and at the other end adjacent said another group pass the said coupling means at the side thereof opposite from said cable.

18. A tow line by which a submerged object may be towed from a ship, which comprises:
(a) a flexible tow cable,
(b) a plurality of fairing units arranged in end to end relationship along, and individually pivotally and slidably mounted upon said cable,
(c) each unit having a channel shaped nose piece through the bottom of the channel of which said cable passes and a separate tail piece of buoyant material having one edge portion thereof removably confined in and closing said open face of said channel of said nose piece, with a space between it and said cable that forms a passage from end to end of the unit,
(d) means for coupling together adjacent ends of adjacent tail pieces with lost motion movement enabling limited separation of adjacent tail pieces,
(e) lost motion and flexible means connecting adjacent ends of adjacent tail pieces, adjacent their trailing edges for helping to keep adjacent units approximately aligned with one another on the cable,
(f) a plurality of flexible conductors, for use in establishing communication between said object and said ship, extending through said passages of adjacent units, and having overall lengths greater than the combined overall lengths of the units, and
(g) each tail piece having a laterally extending space in its edge portion which is received in its said nose piece, into which space said conductors are flexed sidewise when adjacent units are close together and out of which the conductors may be pulled to some extent in straightening them out when such adjacent units separate somewhat as permitted by said lost motion means.

19. A tow line by which a submerged object may be towed from a ship, which comprises:
(a) a flexible tow cable,
(b) a plurality of fairing units arranged in end to end relationship along, and individually pivotally and slidably mounted upon, said cable,
(c) each unit having a channel shaped nose piece through the bottom of the cahnnel of which said cable passes, and a tail piece with one edge portion thereof received in and closing the open face of the channel of said nose piece but spaced from said cable, to provide a passage in the unit from end to end along side of the cable,
(d) means passing between opposite faces of each said nose piece and through said edge portion of said tail piece that is received in the nose piece for removably securing said tail piece in said nose piece,
(e) closed loop elements disposed between adjacent faces of adjacent tail pieces and secured to the tail pieces by some of said securing means that pass through the loops of said elements and provide a lost motion coupling between adjacent tail pieces that permit limited separation of adjacent units,
(f) flexible conductor means extending along side of said cable through said passages in said units, for enabling communication between said object being towed and said ship,
(g) said inner edge portion of each unit within the nose piece of that unit being laterally variable and providing spaces into which said conductor means is fixed sidewise when adjacent units are closer together and out of which the conductor means may be pulled somewhat in straightening it out when adjacent units separate from one another as permitted by said loop elements,
(h) said conductor means being anchored to each unit solely at one small area along the length of the passage, and otherwise free to straighten out.

20. The line according to claim 19, and flexible means slidably connected to and coupling adjacent ends of adjacent units and adjacent to their free, trailing edges, for aiding in keeping such adjacent units aligned with one another.

References Cited by the Examiner

UNITED STATES PATENTS

| 1,977,787 | 10/34 | Wodtke. | |
| 2,401,783 | 6/46 | Wilcoxon | 114—235 |
| 2,891,501 | 6/59 | Rather | 114—235 |
| 3,060,260 | 10/62 | Scofield | 174—117 |
| 3,060,886 | 10/62 | Rather et al. | 114—235 |
| 3,086,491 | 4/63 | Rather et al. | 114—235 |
| 3,172,469 | 364 | Rather et al. | 114—235 |

FOREIGN PATENTS

| 108,761 | 8/17 | Great Britain. |
| 699,558 | 11/53 | Great Britain. |

FERGUS S. MIDDLETON, *Primary Examiner.*